United States Patent [19]

Ritson

[11] Patent Number: 4,682,436
[45] Date of Patent: Jul. 28, 1987

[54] FOLD-AWAY BLIND

[76] Inventor: John R. Ritson, 359 Friendship Cir., Winston-Salem, N.C. 27106

[21] Appl. No.: 816,784

[22] Filed: Jan. 7, 1986

[51] Int. Cl.⁴ ............................................ A01M 31/02
[52] U.S. Cl. ......................................... 43/1; 135/98; 135/901
[58] Field of Search ........................ 43/1; 135/98, 901

[56] References Cited

U.S. PATENT DOCUMENTS

| | | | |
|---|---|---|---|
| 499,965 | 6/1893 | Bushnell | 2/4 |
| 1,888,909 | 11/1932 | Crosthwait | 2/205 |
| 2,221,366 | 11/1940 | Bisbing et al. | 135/98 X |
| 2,594,410 | 4/1952 | Feldpausch | 135/901 X |
| 3,419,024 | 12/1968 | Nickerson, Jr. | 135/98 |
| 4,022,233 | 5/1977 | Grundman | 135/98 X |
| 4,164,089 | 8/1979 | George | 43/1 |
| 4,224,754 | 9/1980 | Derryberry | 43/1 |
| 4,312,371 | 1/1982 | Koon | 135/98 X |
| 4,326,301 | 4/1982 | Brock | 135/98 X |
| 4,364,193 | 12/1982 | Visco | 43/1 |
| 4,505,286 | 3/1985 | Madion | 135/901 X |

FOREIGN PATENT DOCUMENTS

| | | | |
|---|---|---|---|
| 196576 | 3/1958 | Austria | 135/98 |
| 1562282 | 3/1980 | United Kingdom . | |

Primary Examiner—Nicholas P. Godici
Assistant Examiner—Carmine Cuda
Attorney, Agent, or Firm—Griffin, Branigan & Butler

[57] ABSTRACT

A portable fold-away blind (10) for camouflaging a person while in the wilderness has a substantially circular frame (12) which is twistable into a plurality of smaller, substantially circular frame segments (34,36,38) which are placed one upon the other. Frame supporting means (18) supports the frame (12) upon the head of the wearer. Attached to the frame (12) is a flexible cover (14) that extends downward from the frame so as to hide the wearer from view.

11 Claims, 7 Drawing Figures

FOLD-AWAY BLIND

BACKGROUND OF THE INVENTION

I. Field of the Invention

The invention relates to camouflaging blinds of the type for use by persons such as hunters, wildlife photographers, wildlife observers, bird watchers, and the military.

II. Prior Art and Other Considerations

For decades blinds have been used to conceal persons by either disguising the person or by enabling the person to appear to blend with his surroundings. Many blind structures must be erected or built on site. Portable blinds are also available but, for the most part, fail to meet the needs of the user. For example, portable blinds must be compactly stored so as not to be an incumbrance to the soldier, hunter, or woodsman who must transport the blind. Additionally, the portable blind must be capable of quick and easy assembly. Further, the portable blind must provide the user with sufficient room to perform activities associated with the purpose for which he is camouflaged.

U.S. Pat. No. 4,224,754 to Derryberry discloses a portable hunting blind with an elongated coil spring which is coiled between two end rings. When the spring is elongated, a hollow tube of camouflaged cloth is extended in telescoping fashion. While such a device can be compressed to a small height, it is not possible to reduce the diameter of the end rings and spring.

U.S. Pat. No. 499,965 to Bushnell discloses a pocket outdoor mosquito cap with a frame and a sack-shaped net. The frame is fastened on an individual's head and has projecting loops which hold the net away from the face and the neck as it covers the upper part of the wearer's body. When the device is not in use, the net can be collapsed and carried in the wearer's pocket. The device fits closely around the wearer's body and hence does not give persons such as hunters or photographers sufficient room to move their hands.

U.S. Pat. No. 4,164,089 to George discloses a portable blind for use by hunters and photographers. The blind comprises a frame assembly having a flexible cape-like exterior covering. When a person arrives at a desired site, it is necessary for the person to assemble the blind.

In view of the above, it is an object of the invention to provide a portable blind that can be compactly stored and easily assembled.

An advantage of the present invention is the provision of a portable blind that does not inhibit a person's arm or leg movements while being used.

Another advantage of the invention is the provision of a portable blind that is lightweight, compact, and which springs its full diameter when removed from a storage pouch.

SUMMARY

A portable fold-away blind for camouflaging a person while in the wilderness has a substantially circular frame which is twistable into a plurality of smaller, substantially circular frame segments which are placed one upon the other. Frame supporting means in the form of a hat supports the frame upon the head of the wearer. Attached to the frame is a flexible cover that extends downward from the frame so as to hide the wearer from view.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

A camouflaging blind 10 is usable by persons, such as hunters, nature enthusiasts, or military personnel when in the wilderness. The blind 10 comprises a substantially circular flexible frame 12 to which a flexible, essentially cylindrical side wall or cover 14 is attached.

Figure 3A:
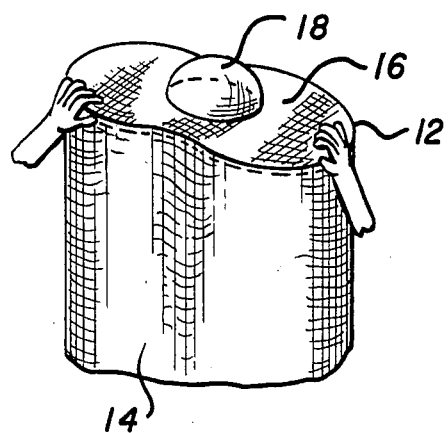
FIGS. 3A, 3B, 3C, and 3D show steps of manipulating the blind of FIG. 1 into a storage configuration; and, FIG. 4 is a cross-sectional view of the blind of FIG. 1 in a utilization configuration and showing the blind in use by a hunter.
Figure 3B:
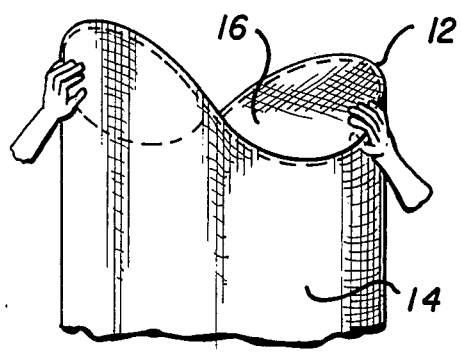
Figure 3C:
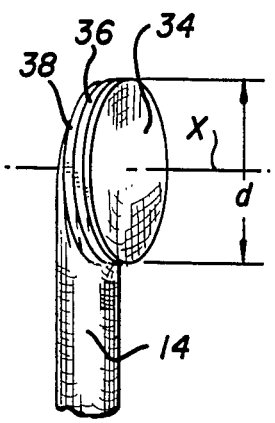

Frame 12 may be manufactured from any suitable flexible material, such as a plastic strip or a spring steel strip. Frame 12 has a rim top 12a and a rim side 12b. The two ends of the strip are connected together by any appropriate means, such as by welding or the use of clips, to form a substantially circular frame having a diameter D of approximately thirty inches. The exact diameter is not critical and may be varied if desired. The flexible nature of the material used for the frame 12 allows it to be twisted into three smaller substantially circular segments that are placed one upon the other. That is, the frame 12 is twistable into three smaller substantially circular segments 34, 36, and 38 which have segment axes X which are essentially colinear and which are alignable proximate one another along the segment axes X. As illustrated in FIG. 3C, segments 34, 36, and 38 each have a diameter d on the order of about one third the diameter D of the fully-open frame 12. The twistable nature of the frame 12 permits compact storage of the blind 10 when not in use.

Attached to the circumference of the frame 12 is a flexible essentially circular top wall or top 16. The top 16 and cover 14 are preferably manufactured from a lightweight flexible material, such as nylon for example. The material has a camouflaging pattern thereon to match the environment in which the blind is to be used. For example, in the winter the material might be white to simulate snow while in the spring the top 16 would have a spring color pattern. The circular top 16 is attached to the frame 12 by any suitable means, such as wrapping the edge of the top around the frame 12 and sewing the material closed.

Proximate the center of the circular top 16 is an opening 17 large enough to receive a means 18 for supporting the frame 12 upon a person's head. In the illustrated embodiment the frame supporting means 18 is a conventional cap such as a baseball cap having an adjustable band 20 so as to allow the cap to be adapted to various size heads. The cap 18, which is preferably colored to match the circular top 16, is secured to the top at the point where the base of the cap meets the opening.

Figure 1:
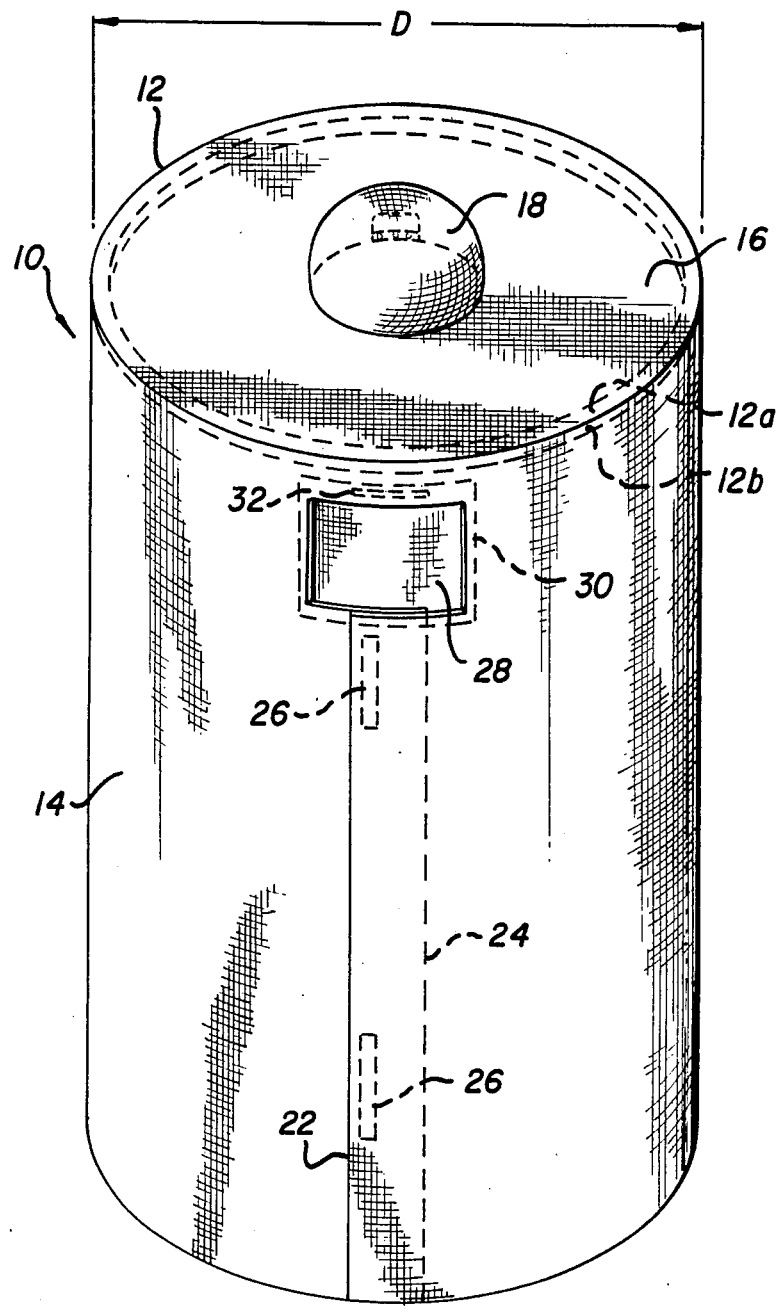
FIG. 1 is a front perspective view of a blind in a utilization configuration according to an embodiment of the invention.
Figure 2:
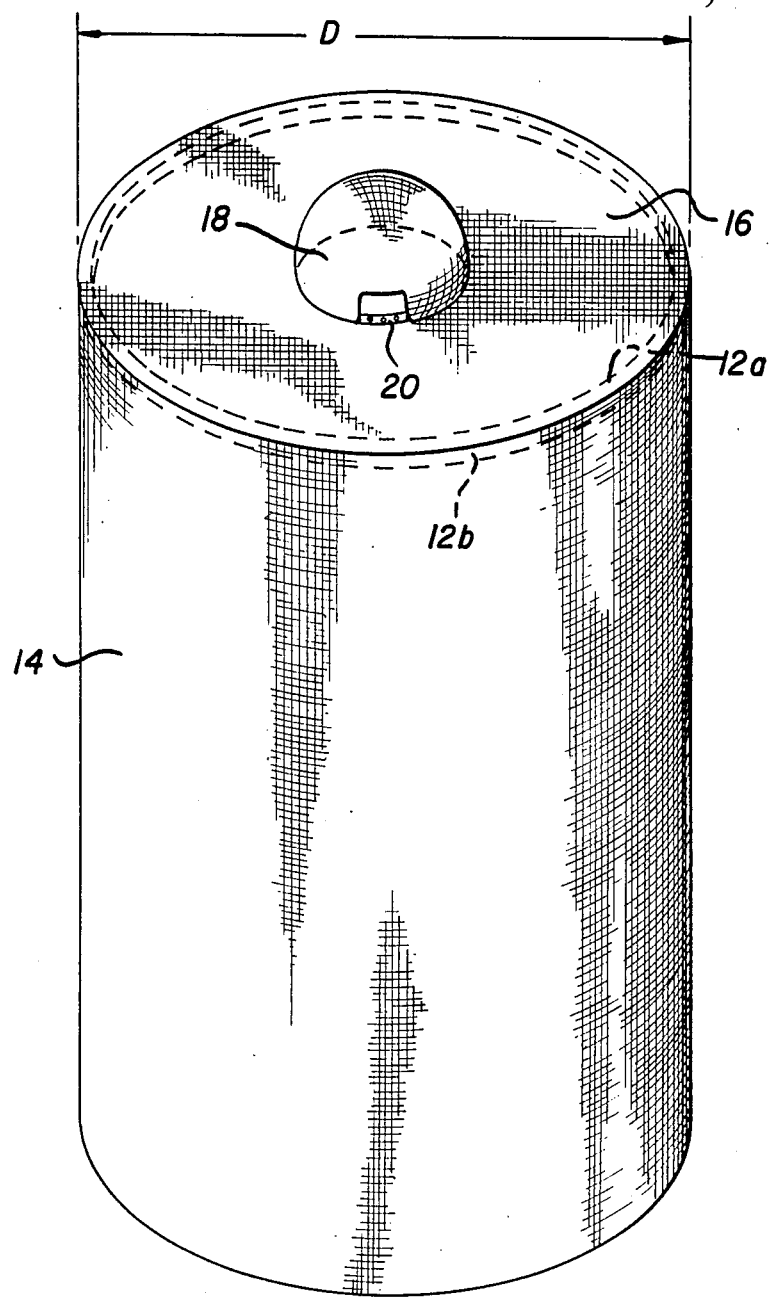
FIG. 2 is a back perspective view of the blind of FIG. 1.

The flexible cover 14 extends downwardly from the circumference of the frame 12 for a length approximately equal to the height of the user. The cover 14 has edges or sides 22 and 24 which overlap each other in the front portion of the blind as shown in FIG. 1. To prevent the sides from darting in the wind, a closure means 26 (such as hook and eye strips of the Velcro type) are used to secure the sides to each other. In this respect, mating strips are provided on an interior surface near edge 22 and an exterior surface near edge 24.

Located at the front of the blind 10 at about eye level is a portal means 28. In the illustrated embodiment portal 28 is a rectangular shaped hole placed in the cover 14. The hole 28 is sufficiently large so that a gun barrel or camera lens may pass through. Associated with the portal means 28 is a flap 30 whose dimensions are slightly larger than the hole 28. The bottom portion of the flap is permanently secured as by stitching, for example, to the interior of the cover 14 proximate the bottom of the hole 28. A closing means 32, such as a hook and eye-type fastener, attached to the top outside portion of the flap, permits the portal means to be alternatively opened and closed.

Figure 4:
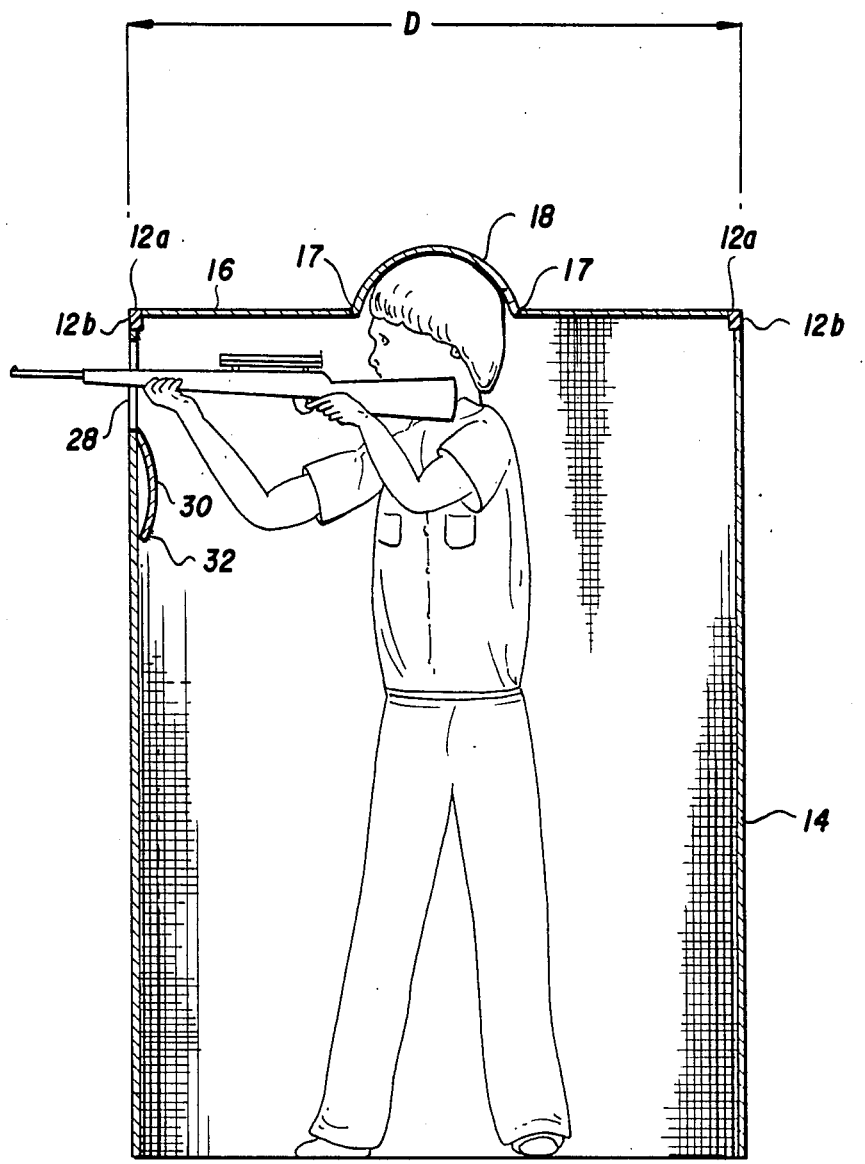

In use, when the blind 10 is already in its unfolded or utilization configuration, a person spreads the sides 22 and 24 apart, enters the interior of the blind 10; and places the cap 18 on his head. If necessary the fit of the cap is adjusted with the aid of band 20. When the cap is properly placed on the person's head, the portal means will be proximate the person's eyes and the sides 22 and 24 will be proximate the person's chest. The two sides 22,24 are then secured to each other by using the strips 26. At this point, the person can effectively blend with the surrounding environment and is hidden from view. As shown in FIG. 4, the cover 14 is spaced away from the wearer by virtue of the sufficiently large diameter D of frame 12 to afford the wearer room to move his arms for the manipulation of equipment, such as a rifle or camera. To use a camera or gun, the closing means 32 on the flap 30 is released. A gun barrel or camera lens can then be extended through the hole 28. The blind may be used in a standing, crouching or kneeling position.

Figure 3D:
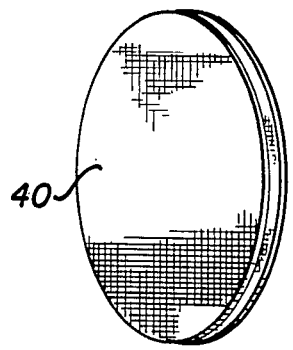

When not in use, the blind is foldable and storable in a compact pouch 40 (see FIG. 3D). For folding, the frame 12 is gripped in each hand, the fingers of one hand being uppermost and the thumb of the other hand being uppermost. A twisting action collapses the frame 12 into three substantially concentric circular segments 34,36,38 that are placed one upon the other as shown in FIG. 3. The twisting action reduces the frame diameter to approximately one-third of the original diameter. The cover 14 is then folded over the frame and the blind is placed in a pouch 40 for storage.

While the invention has been particularly shown and described with reference to the preferred embodiment thereof, it will be understood by those skilled in the art that various alterations in form and detail may be made therein without departing from the spirit and scope of the invention. For example, the sides 22,24 may be provided at other locations such as proximate the wearer's back. Furthermore, the portal means 28 can be placed at any desired location in the flexible cover 14.

The embodiments of the invention in which an exclusive property or privilege is claimed are defined as follows:

1. A portable blind for camouflaging a person while in the wilderness, said blind comprising:

a substantially circular flexible spring frame having a first diameter when said blind is in a utilization configuration, said frame being twistable into substantially circular segments having diameters less than said first diameter and which are placeable proximate one another when said blind is in a storage configuration;

means for supporting said spring frame upon a head of a person comprising a cap which is wearable on a person's head and a circular top, said cap having a discontinuous band with connection means at end portions of said band whereby said connection means facilitates adjustment of said cap to various head sizes, said top having an opening proximate its center sufficiently large to accommodate said cap therein, said cap being attached to said top at said opening, said cap and said top being attached along a portion of said band other than said end portions, the outer circumference of said circular top being attached to said circular frame; and, a flexible side wall attached to said frame, said side wall extending downwardly from said frame and spaced apart from a person when said blind is in said utilization configuration.

2. A blind as recited in claim 1 wherein said spring frame is manufactured from a spring steel strip.

3. A blind as recited in claim 1 wherein said spring frame is manufactured from a plastic strip.

4. A blind as recited in claim 1 wherein said flexible side wall is colored to simulate the colors naturally found in the wilderness.

5. A blind as recited in claim 1 wherein said flexible side wall has two sides positionable in overlapping relation so as to create an opening for allowing a person to gain entry to the inside of said blind.

6. A blind as recited in claim 5 wherein said overlapping sides on said flexible side wall includes a closure means for securing the two sides to each other.

7. A blind as recited in claim 6 wherein said closure means comprises a Velcro strip.

8. A blind as recited in claim 1 including portal means in said flexible sidewall.

9. A blind as recited in claim 8 wherein said portal means comprises a hole in said flexible side wall, said hole having an attached flap for selectively opening and closing said hole.

10. A blind as recited in claim 9 wherein a closing means selectively maintains said flap in said closeable position.

11. A blind as recited in claim 10 wherein said closing means comprises a Velcro strip.

* * * * *